United States Patent
Kubo

(10) Patent No.: US 8,717,631 B2
(45) Date of Patent: May 6, 2014

(54) IMAGE PROCESSING APPARATUS AND METHOD FOR CONTROLLING THE IMAGE PROCESSING APPARATUS

(75) Inventor: Hideki Kubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 13/115,873

(22) Filed: May 25, 2011

(65) Prior Publication Data

US 2011/0292461 A1 Dec. 1, 2011

(30) Foreign Application Priority Data

May 31, 2010 (JP) .................................. 2010-124764
Apr. 21, 2011 (JP) .................................. 2011-095364

(51) Int. Cl.
*H04N 1/405* (2006.01)
(52) U.S. Cl.
USPC .......................... 358/3.26; 358/406; 358/504
(58) Field of Classification Search
USPC .......... 358/3.26, 504, 406, 500, 400, 1.9, 2.1; 382/275
See application file for complete search history.

(56) References Cited

U.S. PATENT DOCUMENTS 6,045,515 A * 4/2000 Lawton .......................... 600/558

FOREIGN PATENT DOCUMENTS

| JP | 10-20579 A | 1/1998 |
| JP | 11-112810 A | 4/1999 |

* cited by examiner

*Primary Examiner* — Thomas D Lee
*Assistant Examiner* — Stephen M Brinich
(74) *Attorney, Agent, or Firm* — Canon U.S.A., Inc. IP Division

(57) ABSTRACT

An image processing apparatus includes a pattern generation unit configured to cause an image forming section to generate a plurality of image patterns that have periodicity unique to the image forming section and are different from each other, a selection unit configured to select one test pattern from the generated plurality of image patterns, and an image correction unit configured to correct an image based on the test pattern selected by the selection unit.

11 Claims, 12 Drawing Sheets

| PARAMETER<br>MODULE | COLOR | PERIODICITY [mm] | WAVEFORM | AMPLITUDE | INITIAL PHASE [rad] | DRIVING SIGNAL COUNT |
|---|---|---|---|---|---|---|
| K PHOTOSENSITIVE DRUM DRIVE GEAR | K | 2.5 | ∿ | 0.1 | 0 | 0 |
| INTERMEDIATE TRANSFER BELT DRIVING MOTOR | C, M, Y, K | 32.0 | ∿ | 0.1 | 0 | 0 |

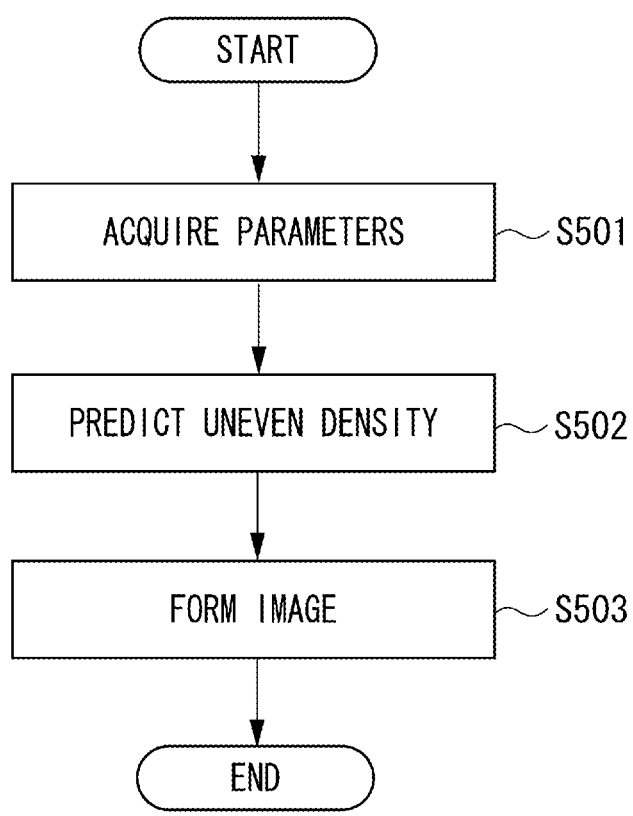

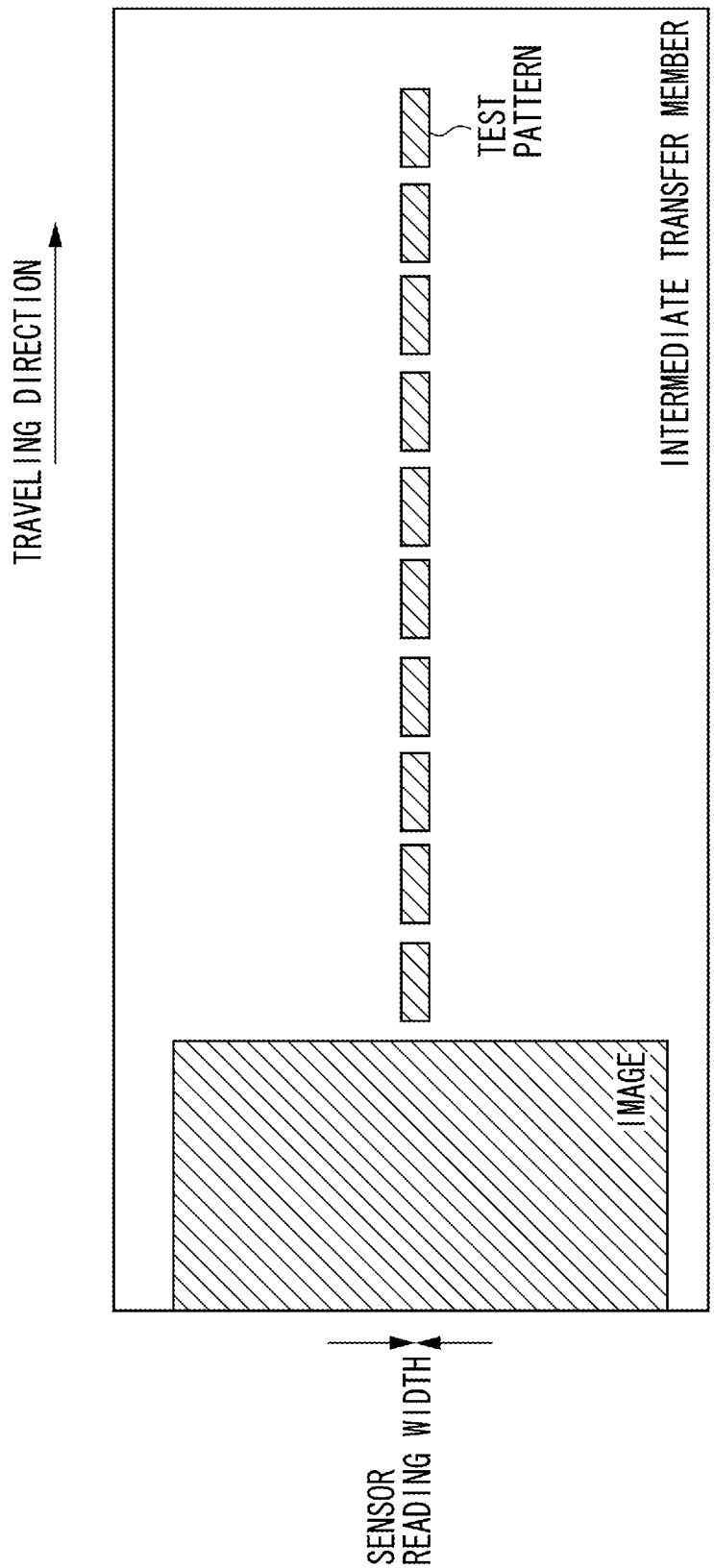

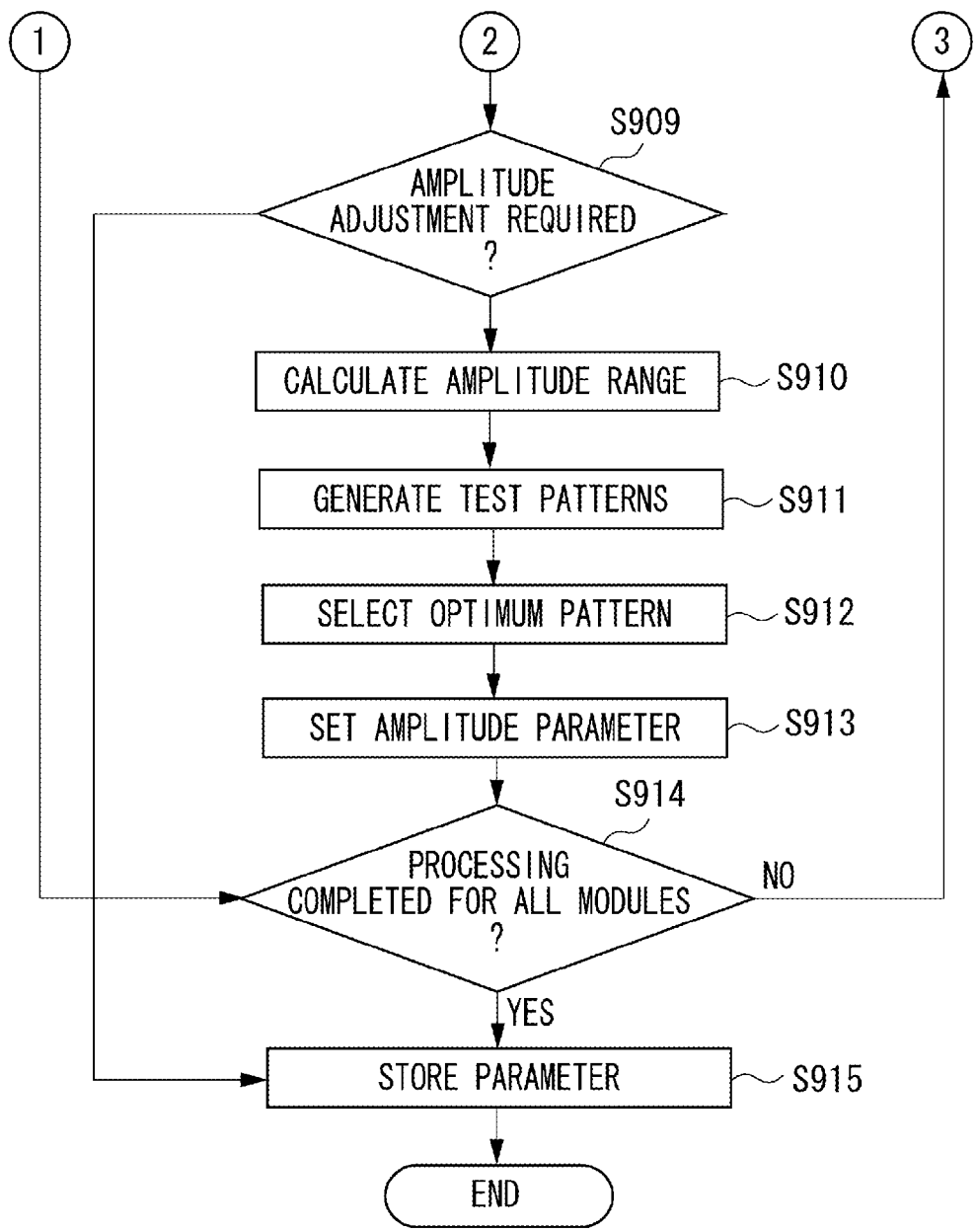

IMAGE PROCESSING APPARATUS AND METHOD FOR CONTROLLING THE IMAGE PROCESSING APPARATUS

BACKGROUND OF THE INVENTION

1. Field of the Invention

The present invention relates to a technique capable of easily eliminating or reducing uneven density.

2. Description of the Related Art

An image forming section of a conventional image processing apparatus includes a plurality of modules, such as a photosensitive drum, a charging device, an exposure device, a developing device, and a transfer device. In the above-described image forming section, the charging device uniformly charges the photosensitive drum while the photosensitive drum is rotating.

Next, the exposure device selectively exposes a charged photosensitive drum surface to form an electrostatic latent image on the photosensitive drum. Then, the developing device develops the electrostatic latent image formed on the photosensitive drum into a visible toner image. The transfer device transfers the obtained toner image onto a recording material.

In the above-described image forming section, uneven density (banding) may appear periodically on the photosensitive drum in a rotational direction thereof, more specifically, in a sub scanning direction. Many of the above-described modules include rotational members, such as drums, rollers, sleeves, and screws, which rotate continuously during their operations.

In general, a motor serving as a rotational power source of each module has an error in its rotational behavior. The rotational speed of each motor is variable depending on the rotational angle of a motor shaft. Therefore, for example, the rotational speed of the photosensitive drum varies periodically in accordance with the rotation of a driving motor.

According to the periodic variation in the rotational speed of the photosensitive drum, the quantity of exposure per unit area changes periodically and periodic uneven density appears on an output image. Further, the accuracy of a gear that transmits motor driving power to a rotary member becomes a cause of the uneven density.

Further, if a rotational shaft of a rotary member has a certain amount of eccentricity, for example, when the photosensitive drum has a certain amount of eccentricity, the distance between the photosensitive drum and the developing device changes periodically. Therefore, a significant amount of periodic uneven density appears due to a change in developing efficiency corresponding to the distance.

Further, the AC voltage applied to the charging and developing devices becomes a cause that may induce the periodic uneven density because the developing amount changes similarly. As described above, a general image forming section includes various modules that may induce the periodic uneven density.

Further, in a case where a device includes a plurality of modules each having a unique periodicity, a significant amount of interference may occur between two or more different frequencies and a composite periodic uneven density may appear.

To solve the above-described problem, as discussed in Japanese Patent Application Laid-Open No. 10-20579, there is a conventional technique capable of adjusting a turn-on period of an exposure device to correct the density based on a generated density variation detected by a density detection device.

Further, the image forming section can include a scanner capable of reading a final image (i.e., a test image) to detect a density distribution. The detected density distribution can be used to correct the periodic uneven density.

For example, as discussed in Japanese Patent Application Laid-Open No. 11-112810, a scanner performs a scanning operation to read a test image and detect density data in a main or sub scanning direction. Then, pixel data correction is performed using correction data generated based on the detected density data. According to any one of the above-described conventional techniques, the periodic uneven density can be reduced by performing correction having inverse characteristics in such a way as to cancel or reduce the generated density characteristics.

According to the technique discussed in Japanese Patent Application Laid-Open No. 10-20579, it is required to measure all information about periodicity, waveform, phase, and amplitude and determine correction parameters. Therefore, it is required to detect the density of an image at intervals sufficiently smaller than the periodicity of the image forming section.

Therefore, the density detection device is required to have highly accurate resolution and response. Further, to equalize the phases of a plurality of periodicities generated by respective modules, it is required to adjust the design features (e.g., an outer diameter of each module) to be the same or in an integer multiple relationship. Thus, the degrees of freedom in the design stage are reduced.

Further, according to the technique discussed in Japanese Patent Application Laid-Open No. 11-112810, it is similarly required to measure information about all of periodicity, waveform, phase, and amplitude and determine correction parameter. Thus, a large-scale device, such as the above-described scanner, is required.

Further, it is required to perform correction at intervals equivalent to an image formed on a transfer member or a paper. Therefore, the rotational periodicity of each module is required to be an integer fraction of the image. If the rotational periodicity of a module is not an integer fraction of the image, the phase of the module causes a stepwise deviation in each output. Therefore, a correction amount calculated based on an output of the scanner cannot be effectively used in the correction.

Further, each of the above-described techniques requires a memory that stores measurement data and a synchronization system that synchronizes measurement timing with correction timing. Accordingly, an apparatus having a large-scale configuration is required and it is difficult to realize a low-cost apparatus.

SUMMARY OF THE INVENTION

The present invention is directed to an image processing apparatus that can easily eliminate or reduce uneven density having periodicity unique to each module.

According to an aspect of the present invention, an image processing apparatus includes a pattern generation unit configured to cause an image forming section to generate a plurality of image patterns that have periodicity unique to the image forming section and are different from each other, a selection unit configured to select one test pattern from the generated plurality of image patterns, and an image correction unit configured to correct an image based on the test pattern selected by the selection unit.

According to an exemplary embodiment of the present invention, the uneven density having the periodicity unique to each module can be eliminated or reduced with a simple configuration.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating light quantity correction processing that can be performed by the density correction unit according to the first exemplary embodiment of the present invention.

FIG. 6 illustrates an example of a test pattern according to a second exemplary embodiment of the present invention.

FIGS. 9A and 9B are flowcharts according to a fourth exemplary embodiment of the present invention.

DESCRIPTION OF THE EMBODIMENTS

Various exemplary embodiments, features, and aspects of the invention will be described in detail below with reference to the drawings.

An image forming section of an image processing apparatus generates uneven density whose variation periodicity is dependent on the periodicity of a rotational member or the AC voltage. In many cases, the variation periodicity of the uneven density can be known beforehand in the design stage of the image forming section.

Further, the waveform that indicates a variation of the density during one period has a shape substantially determined according to each module (i.e., each cause) and has a higher reproducibility. It is, therefore, feasible to prepare the waveform beforehand.

Further, in many cases, a sine wave can be used to approximate the variation periodicity occurring in an actual image forming section. Further, in a case where a waveform representing the uneven density is different from a waveform representing the correction, for example, if the uneven density occurring in a triangular waveform is corrected with a sine wave having the opposite phase, the uneven density can be reduced significantly although a higher harmonics wave may appear.

Further, the phase and the amplitude are examples of features required in correction of the uneven density. Regarding the amplitude, if a generated error is in a range from 0 to 2 times the actual amplitude, the uneven density is not so worsened compared to the non-corrected one. Therefore, an excessive accuracy is not required with respect to the amplitude.

On the other hand, regarding the phase, there is a problem arising when waves are simply added. If an applied correction has inverse characteristics in a state where a deviation amount is equal to or greater than ⅙ of the variation periodicity, the uneven density is worsened compared to the non-corrected one. Therefore, in an actual correction, it is important to determine an effective acquisition procedure for the phase and the amplitude of the uneven density.

Figure 1:
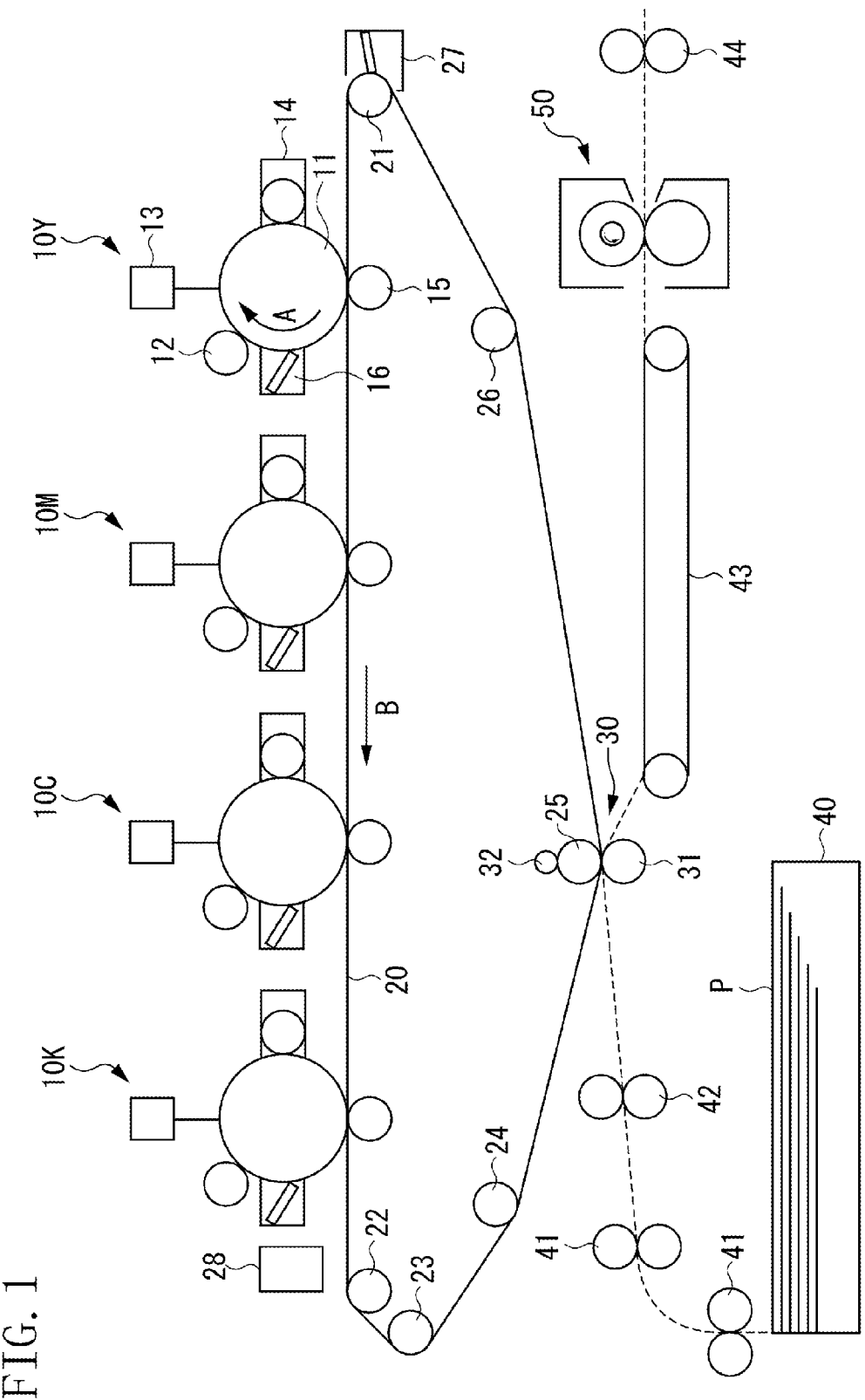
FIG. 1 schematically illustrates an example configuration of an image forming section according to a first exemplary embodiment of the present invention.

FIG. 1 schematically illustrates an example configuration of an image forming section according to a first exemplary embodiment of the present invention. The image forming section according to the present exemplary embodiment includes a plurality of (for example, "four" according to the example illustrated in FIG. 1) image forming units 10 (more specifically, 10Y, 10M, 10C, and 10K). Each image forming unit 10 can form a toner image of a predetermined color according to an electro-photographic image forming method.

Further, the image forming section includes an intermediate transfer belt 20 (an endless belt) on which toner images of different colors are successively transferred (primarily transferred) from respective image forming units 10 (10Y, 10M, 10C, and 10K). Further, the image forming section includes a secondary transfer device 30 that can collectively transfer (secondarily transfer) the toner images from the intermediate transfer belt 20 to paper P. Further, the image forming section includes a fixing device 50 that can fix the secondarily transferred toner image on the paper P.

Respective image forming units 10 (10Y, 10M, 10C, and 10K) are similar to each other in configuration, except for the color of a toner to be used. Hence, as a representative example, only the yellow image forming unit 10Y is described below in detail. The yellow image forming unit 10Y includes a photosensitive layer (not illustrated) and a photosensitive drum 11 that can rotate in a direction indicated by an arrow A.

Devices sequentially disposed around the photosensitive drum 11 are a charging device 12, an exposure unit 13, a developing device 14, a primary transfer device 15, and a cleaner 16. The charging device 12 can charge the photosensitive drum 11 to have a predetermined electric potential.

The exposure unit 13 can form an electrostatic latent image on the photosensitive drum 11 with a laser beam, in a state where the photosensitive drum 11 is charged by the charging device 12 to have a predetermined negative electric potential. The developing device 14, accommodating a corresponding color (i.e., yellow) toner, can develop an electrostatic latent image on the photosensitive drum 11 with the yellow toner.

The primary transfer device 15 can primarily transfer a toner image formed on the photosensitive drum 11 onto the intermediate transfer belt 20. The cleaner 16 can remove the residue (toner etc.) remaining on the photosensitive drum 11 after the toner image has been primarily transferred to the intermediate transfer belt 20.

The intermediate transfer belt 20 is stretched around a plurality of (for example, "six" in the present exemplary embodiment) support rollers. The intermediate transfer belt 20 can move along a circulating path defined by the plurality of support rollers. A driving roller 21 (one of the plurality of support rollers) can rotate around its rotational axis to drive the intermediate transfer belt 20 stretched around an outer cylindrical surface thereof.

The intermediate transfer belt 20 is tightened by a plurality of driven rollers 22, 23, and 26, which are freely rotatable while the intermediate transfer belt 20 is driven by the driving roller 21. A correction roller 24 is tiltable and supported at one end thereof in the axial direction. The correction roller 24 is functionally operable as a steering roller that can prevent a skew motion of the intermediate transfer belt 20, which may deviate in a direction substantially perpendicular to the conveying direction of the intermediate transfer belt 20.

A backup roller 25, around which the intermediate transfer belt 20 is stretched, is functionally operable as a constituent member of the secondary transfer device 30. A belt cleaner 27 is disposed at a position closely opposed to the driving roller 21 via the intermediate transfer belt 20. The belt cleaner 27 can remove the residue (toner etc.) remaining on the intermediate transfer belt 20 after the toner images are secondarily transferred onto the paper P.

The secondary transfer device 30 includes a secondary transfer roller 31 that can be pressed against an image carrying surface of the intermediate transfer belt 20. The secondary transfer roller 31 is opposed to the backup roller 25, which is disposed on a reverse surface side of the intermediate transfer belt 20 and serves as a counter electrode of the secondary transfer roller 31.

A power supply roller 32, which is brought into contact with the backup roller 25, can apply a secondary transfer bias whose polarity is similar to the toner charging polarity. The secondary transfer roller 31 is grounded.

A paper conveyance system includes a paper tray 40, a pair of conveyance rollers 41, a pair of registration rollers 42, an endless conveyance belt 43, and a pair of discharge rollers 44. The paper conveyance system feeds the uppermost paper P to the conveyance rollers 41 from the paper tray 40 and temporarily stops the paper P at a position corresponding to the registration rollers 42. Subsequently, the paper conveyance system sends the paper P to a secondary transfer position of the secondary transfer device 30 at predetermined timing.

Further, the paper conveyance system conveys the paper P on which toner images are secondarily transferred to the fixing device 50 via the conveyance belt 43. Then, the discharge rollers 44 discharge the paper P from the fixing device 50 to the outside of the image forming section.

Next, example image forming processing that can be performed by the image forming section is described below. If a start switch (not illustrated) is operated, the image forming section starts predetermined image forming processing. More specifically, in a case where the image forming section is a digital color copying machine, the image forming section causes a color image reading device to read a document placed on a document positioning plate (not illustrated). Then, the image forming section acquires a reading signal from the color image reading device.

Next, the image forming section causes a processing circuit to convert the obtained reading signal into a digital image signal and temporarily stores the digital image signal in a memory. Then, the image forming section performs toner image formation of respective colors based on the digital image signals of four colors, cyan (C), magenta (M), yellow (Y), and black (K), stored in the memory.

More specifically, the image forming section drives each image forming unit 10 (more specifically, 10Y, 10M, 10C, and 10K) according to the obtained digital image signal of a corresponding color.

Next, in each image forming unit 10, the exposure unit 13 irradiates the photosensitive drum 11 uniformly charged by the charging device 12 with a laser beam according to a corresponding digital image signal, to form an electrostatic latent image. Then, the developing device 14 develops the electrostatic latent image formed on the photosensitive drum 11 to form a toner image of the corresponding color. In a case where the image forming section is a printer, the image forming section performs toner image formation of each color based on a digital image signal input from an external device, such as a personal computer.

Subsequently, the primary transfer device 15 primarily transfers the toner image formed on the photosensitive drum 11 to a confronting surface of the intermediate transfer belt 20 at a primary transfer position where the photosensitive drum 11 is brought into the intermediate transfer belt 20. After the above-described primary transfer of the toner image to the intermediate transfer belt 20, the toner remaining on the photosensitive drum 11 is cleaned by the cleaner 16.

Respective toner images having been primarily transferred on the intermediate transfer belt 20, as described above, are mutually overlapped on the intermediate transfer belt 20. Then, the overlapped toner images are conveyed to the secondary transfer position in accordance with a rotational movement of the intermediate transfer belt 20. On the other hand, the paper P is conveyed to the secondary transfer position at predetermined timing. The secondary transfer roller 31 nips the paper P in a state where the behind side of the paper P is supported by the backup roller 25.

Then, under a transfer field formed between the secondary transfer roller 31 and the backup roller 25, the toner image carried on the intermediate transfer belt 20 is secondarily transferred onto the paper P at the secondary transfer position. The conveyance belt 43 conveys the paper P carrying the transferred toner image to the fixing device 50. The fixing device 50 applies heat and pressure to the paper P to fix the toner image formed thereon. Subsequently, the paper P is output to an externally provided discharge tray (not illustrated). After the above-described secondary transfer operation, the toner remaining on the intermediate transfer belt 20 is cleaned by the belt cleaner 27.

Figure 2A:
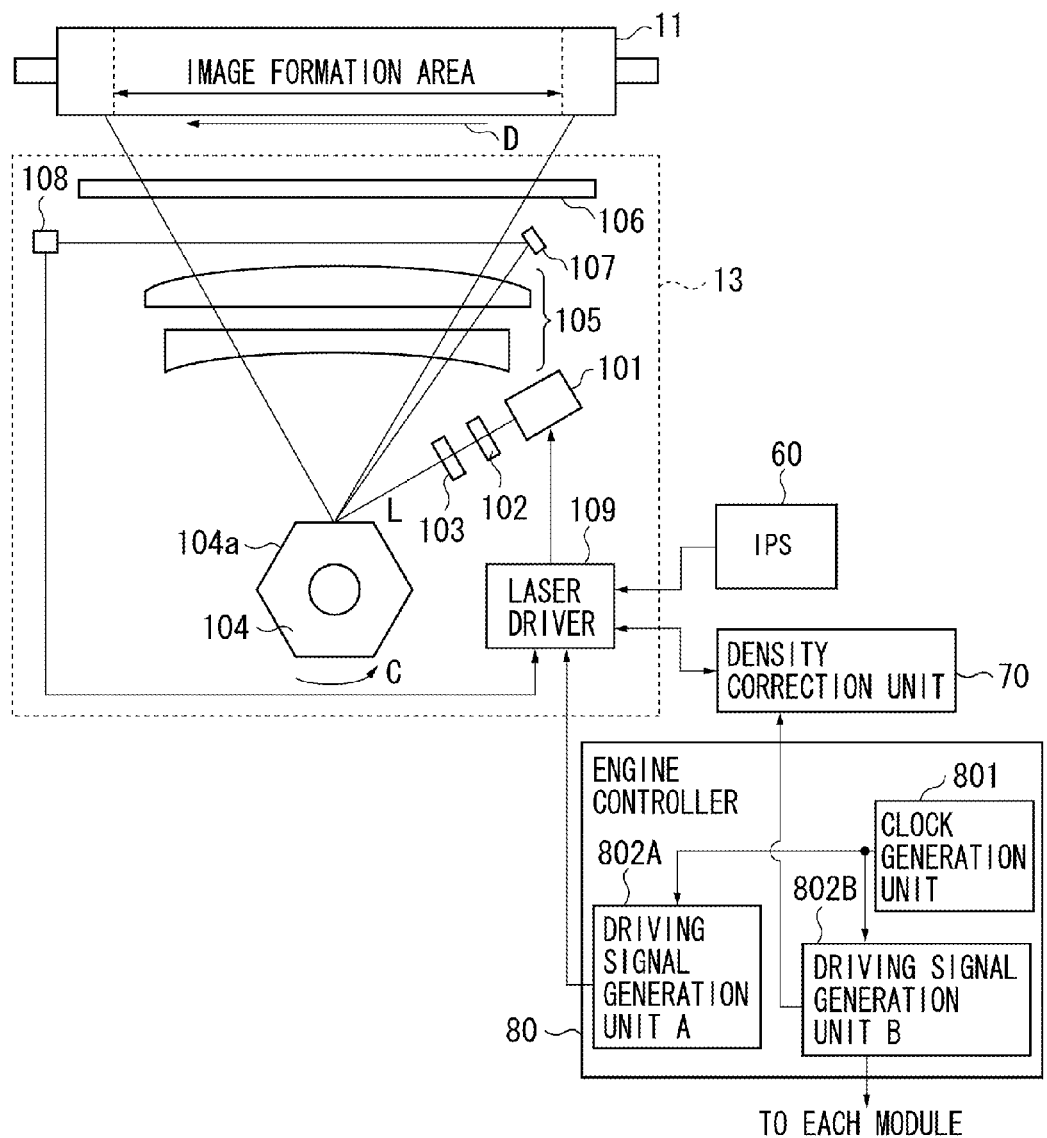
FIGS. 2A to 2C schematically illustrate an example configuration of an exposure unit according to the first exemplary embodiment of the present invention.

FIG. 2A illustrates an example configuration of the exposure unit 13, which is functionally operable as a unit capable of changing image forming conditions. The exposure unit 13 performs a scanning operation to expose the photosensitive drum 11 (i.e., a photosensitive member) in the following manner.

The exposure unit 13 includes a light source 101, a collimator lens 102, a cylinder lens 103, and a rotary polygonal mirror 104. The light source 101 can include a semiconductor laser. For example, the rotary polygonal mirror 104 has a hexagonal columnar body. The exposure unit 13 further includes an fθ lens (beam-condensing lens) 105, a folding mirror 106, a reflection mirror 107, and a Start Of Scan (SOS) sensor 108.

In the exposure unit 13, the light source 101 emits a divergent laser beam L. The collimator lens 102 converts the laser beam L into a parallel beam. The cylinder lens 103, having a refractive power only in the sub scanning direction, focuses the laser beam L, as a line image extending in the main scanning direction, in the vicinity of a deflecting reflection surface 104a of the polygonal mirror 104.

Then, the laser beam L is reflected by the deflecting reflection surface 104a of the polygonal mirror 104 while the polygonal mirror 104 is rotating around its rotational axis at a predetermined higher speed. Thus, the scanning operation is performed at a constant angular speed in the counterclockwise (i.e., in a direction indicated by an arrow C).

After the laser beam L has passed through the fθ lens 105, the folding mirror 106 changes the direction of the laser beam L toward the surface of the photosensitive drum 11 in such a way as to perform a scanning operation to expose the surface of the photosensitive drum 11 in a direction indicated by an arrow D.

In the present exemplary embodiment, the fθ lens 105 has the capability of realizing an equi-speed scanning of a light spot of the laser beam L. Further, the cylinder lens 103 can focus the above-described line image in the vicinity of the deflecting reflection surface 104a of the polygonal mirror 104. The fθ lens 105 focuses the light spot of the laser beam L on the surface of the photosensitive drum 11, in the sub scanning direction, with respect to the deflecting reflection surface 104a (an object point). Accordingly, the above-described scanning optical system has the capability of correcting the plane tilt of the deflecting reflection surface 104a.

Further, the laser beam L reaches the SOS sensor 108 via the reflection mirror 107 prior to the scanning operation to expose the surface of the photosensitive drum 11. More specifically, the SOS sensor 108 receives the initial laser beam L of each scanning line every time the surface of the photosensitive drum 11 is scanned with the laser beam L. Then, the SOS sensor 108 detects irradiation timing of each scanning line on the surface of the photosensitive drum 11 and generates an SOS signal indicating irradiation start timing.

The light source 101 is connected to a laser driver 109 that outputs a laser activation signal at predetermined timing based on image data to be written, which is output from an image signal generation unit (IPS) 60. The laser driver 109 performs ON/OFF control for the semiconductor laser of the light source 101 based on the image data to be written, which can be supplied from the IPS 60. Thus, the light source 101 can emit the laser beam L whose intensity corresponds to the image data to be written.

Further, the laser driver 109 is connected to an engine controller 80. The engine controller 80 includes a driving signal generation unit A 802A and a driving signal generation unit B 802B. The laser driver 109 receives a driving signal supplied from the driving signal generation unit A 802A. Further, the laser driver 109 sets the start timing to output the laser activation signal to be supplied to the semiconductor laser of the light source 101 based on the received driving signal.

Further, the laser driver 109 is connected to the SOS sensor 108 to receive the SOS signal generated by the SOS sensor 108. Then, the laser driver 109 sets the start timing to output the laser activation signal to the semiconductor laser of the light source 101 based on the SOS signal from the SOS sensor 108.

In the present exemplary embodiment, the laser driver 109 controls the semiconductor laser of the light source 101 based on the driving signal generated by the engine controller 80 as well as the SOS signal from the SOS sensor 108. The driving signal and the SOS signal are differently used in the control.

The driving signal generated by the engine controller 80 is a vertical synchronizing signal, which can be used to synchronize an operation of a module represented by the photosensitive drum 11. The SOS signal from the SOS sensor 108 is a horizontal synchronizing signal, which can be used to control the position of an image in the main scanning direction of the laser.

Further, the laser driver 109 receives a density variation signal from the density correction unit 70. The density correction unit 70 generates a signal representing a density variation in the sub scanning direction, which may be caused by rotational members of respective units, such as the photosensitive drum 11 and a developing roller equipped in the developing device 14 (see FIG. 1), and outputs the generated density variation signal to the laser driver 109.

The laser driver 109 adjusts the light quantity of the laser beam L to be emit from the semiconductor laser of the light source 101 based on the density variation signal supplied from the density correction unit 70. The light quantity adjustment of the laser beam L is performed not before the SOS signal is detected and not after the scanning operation actually starts to expose the surface of the photosensitive drum 11.

The density correction unit 70 is connected to the engine controller 80 to receive a module activation signal from the driving signal generation unit B 802B of the engine controller 80. The density correction unit 70 calculates a density variation amount based on the received module activation signal.

Hereinafter, an example adjustment of the quantity of light emitted from the laser beam L is described below. In general, the quantity of light to be used in the exposure processing is maintained at a constant power level. To this end, for example, a calibration is performed to equalize the maximum density of the image forming section with a target value.

To simplify the description, if the light quantity of the image forming section is proportional to the density, it is feasible to eliminate or reduce the uneven density by controlling the light quantity using a coefficient having inverse characteristics.

More specifically, it is now presumed that the target density is 1.0 and the density is variable in a range from 0.9 to 1.1. In this case, if the light quantity is 1.0 when the density is 1.0, the uneven density can be eliminated or reduced by setting the light quantity to have a value in a range from 1/0.9 to 1/1.1, which is equivalent to a reciprocal of the density variation.

As described above, in the present exemplary embodiment, the exposure unit 13 is controlled based on the density variation signal having been set by the density correction unit 70 in such a way as to eliminate or reduce the uneven density periodically occurring in the sub scanning direction.

Next, density variation data setting processing (i.e., light quantity correction data setting processing) that can be performed by the density correction unit 70 is described below in more detail with reference to a flowchart illustrated in FIG. 3. Further, an example configuration of the density correction unit 70 is described below with reference to FIG. 2B.

Figures 2B, 2C:
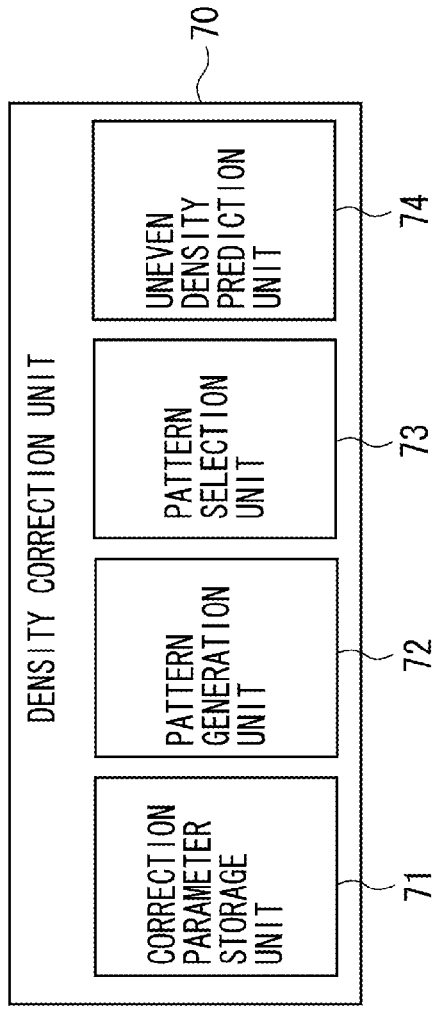
Figure 3:
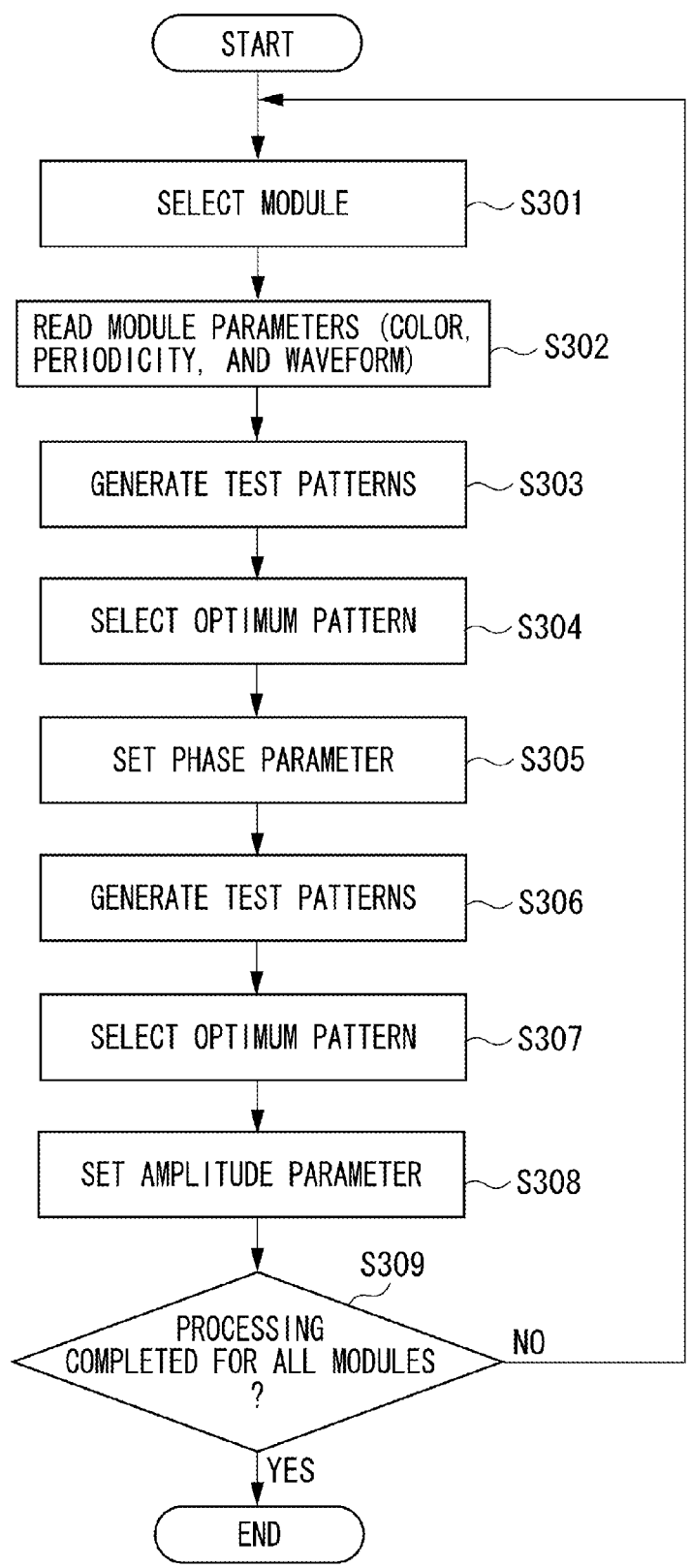
FIG. 3 is a flowchart illustrating light quantity correction data setting processing that can be performed by a density correction unit according to the first exemplary embodiment of the present invention.

As illustrated in FIG. 2B, the density correction unit 70 includes a correction parameter storage unit 71, a pattern generation unit 72, a pattern selection unit 73, and an uneven density prediction unit 74. The density correction unit 70 executes the above-described light quantity correction data setting processing at arbitrary timing, for example, immediately after a power source of the image forming section is turned on or when a long time has elapsed.

The correction parameter storage unit 71 stores various parameters, such as color Cl, periodicity P, waveform f, amplitude A, initial phase α, and driving signal count Cn, which are the causes that may induce periodicity unique to the image forming section (device unique periodicity), more specifically, periodic uneven density, for each module.

FIG. 2C illustrates a table that stores example values of respective parameters (i.e., color Cl, periodicity P, waveform f, amplitude A, initial phase α, and driving signal count Cn) that may induce the uneven density, which are calculated beforehand and stored in association with each module name. In FIG. 2C, the color Cl is a factor unique to each module.

For example, each image forming unit 10 can independently perform an image forming operation for a designated one of respective colors C, M, Y, and K. Thus, a module included in the image forming unit 10K causes uneven density appearing on an image of K color. Further, the intermediate transfer belt 20 is commonly used for all colors C, M, Y, and K.

The periodicity P of each module represents the uneven density periodically appearing on a paper output from the image forming section. The periodicity P of each module can be easily calculated based on the rotational speed of the module (i.e., the number of revolutions per unit time) and the driving speed of the photosensitive drum or the intermediate transfer belt (i.e., the moving distance per unit time).

Regarding the waveform f, an appropriate pattern can be stored by acquiring a density pattern beforehand. Further, to acquire appropriate values in the subsequent processing, predetermined initial values are set for the amplitude A, the initial phase α, and the driving signal count Cn of each module (e.g., amplitude A=0.1, initial phase α=0 radian, and count Cn=0).

In the present exemplary embodiment, a driving gear (not illustrated) of the photosensitive drum 11K and a driving motor of the intermediate transfer belt 20 are two representative modules that may induce the uneven density. The driving gear of the photosensitive drum 11K has a periodicity P of 2.5 mm. The driving motor of the intermediate transfer belt 20 has a periodicity P of 32.0 mm. In respective modules, the waveform f is a sine wave.

First, in step S301, the pattern generation unit 72 selects one of the modules stored in the correction parameter storage unit 71. When there is a plurality of modules, the pattern generation unit 72 selects an arbitrary module. If sequential processing is performed in steps S301 to S308, then in step S309, the density correction unit 70 determines whether the sequential processing of steps S301 to S308 has been completed for all modules.

If it is determined that the processing is not completed for all modules (NO in step S309), the density correction unit 70 repeats similar processing for each of the remaining modules. In the present exemplary embodiment, the pattern generation unit 72 selects the driving gear of the photosensitive drum 11K (i.e., the first module in the table illustrated in FIG. 2C). Then, the processing proceeds to the next step.

In step S302, the pattern generation unit 72 reads the parameters (i.e., color Cl, periodicity P, and waveform f) of the module selected in step S301 from the correction parameter storage unit 71.

Next, in step S303, the pattern generation unit 72 generates a plurality of test patterns having correction effects differentiated in initial phase α with respect to respective parameters (i.e., color Cl, periodicity P, and waveform f) of the module read in step S302.

Hereinafter, a relationship between periodicity/phase of the module and the driving signal count is described below. If a module is a cause that may induce any unevenness in density, an image includes a corresponding uneven density that appears periodically according to the periodicity of the module. In general, the driving signal of a module indicates a period of time during which the module is driven (=rotated). Therefore, the pattern generation unit 72 can calculate a specific timing phase by counting the driving signal.

The pattern generation unit 72 resets the driving signal count Cn of the correction parameter storage unit 71 and sets the driving signal count Cn to 0 at predetermined timing. In the subsequent processing, the correction parameter storage unit 71 counts (Cn=Cn+1) the module activation signal supplied from the driving signal generation unit B802B of the engine controller 80. If the count value reaches a predetermined level corresponding to the periodicity P of the module, the correction parameter storage unit 71 resets the driving signal count Cn (Cn=0).

Subsequently, the pattern generation unit 72 outputs a signal to the IPS 60 to output a uniform image having an image width of 2 cm in the main scanning direction, an image height of 3 cm in the sub scanning direction, and an area rate of 100%. The IPS 60 generates a test pattern image based on the signal supplied from the pattern generation unit 72 and transmits the generated test pattern image to the laser driver 109.

At the same time, the pattern generation unit 72 transmits a plurality of density variations ODvar, which are differentiated in initial phase αi and can be calculated according to the following formula (1), to the laser driver 109.

$$ODvar = A \cdot f(2\pi/P \cdot Cn + \alpha i) \quad (1)$$

In formula (1), A represents the amplitude, f represents a function representing the waveform, P represents the periodicity of the selected module, Cn represents the count value of the driving signal, and αi represents the initial phase of the test pattern. The periodicity P has a converted value similar in units to the count value Cn of the driving signal driving signal.

Further, the initial phase αi is variable from 0 to $2\pi$ in increments of $1/32\pi$ when it is allocated to 64 test patterns. If the waveform f is a sine wave, the density variation ODvar can be represented by the following formula (2).

$$ODvar = A \cdot \sin(2\pi/P \cdot Cn + \alpha i) \quad (2)$$

In the present exemplary embodiment, the method for obtaining the density variations ODvar is not limited to the usage of the above-described calculation formula. For example, it is useful to use a look-up table (LUT) that stores a relationship between the module periodicity P, the driving signal count value Cn, the initial phase α, and the amplitude value.

The laser driver 109 forms a test pattern image with a light quantity E that can be calculated by the following formula (3) based on a predetermined light quantity $E_0$ corresponding to the image data output from the IPS 60 and the density variation ODvar having a differentiated initial phase αi output from the pattern generation unit 72.

$$E = E_0 \times (ODtarget - ODvar)/ODtarget \quad (3)$$

In formula (3), ODtarget represents a target density value to be obtained in a state where no density variation is generated.

If the module selected in step S301 is the driving gear of the photosensitive drum 11K, usable parameters are the color K, the periodicity 2.5 mm, and the sine wave, which have been acquired in step S302. In this case, the appearing uneven density is known in color, periodicity, and waveform and unknown in phase and amplitude. Hence, the amplitude is set to a predetermined value. The laser driver 109 generates 64 test patterns whose initial phase changes in increments of 1/64 period. The laser driver 109 allocates an identification number to each test pattern and outputs the test pattern.

If the module processes only one color, the laser driver 109 outputs test patterns of the same color. Further, if the module processes a plurality of colors, the laser driver 109 outputs test patterns of an arbitrary color selected considering the easiness in pattern selection (described below).

For example, if the selected module is the intermediate transfer belt 20 that relates to all colors C, M, Y, and K, the laser driver 109 outputs test patterns of color K because of easiness in checking correction effects on respective test patterns. Further, it is desired that the size of each test pattern in the sub scanning direction is equal to or greater than at least one period of the periodicity of the module.

Figure 4A:
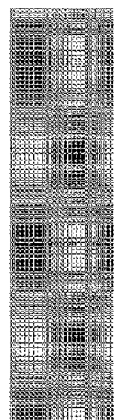
FIGS. 4A to 4C illustrate examples of output test patterns.
Figure 4B:
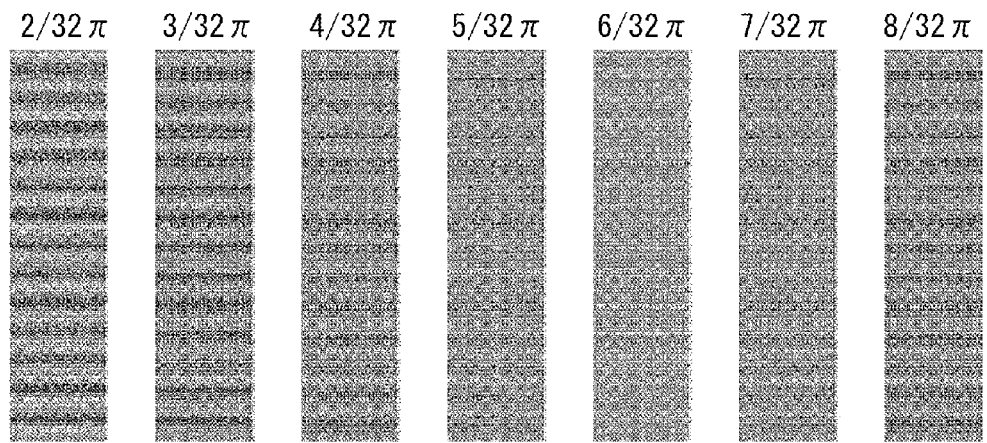
Figure 4C:
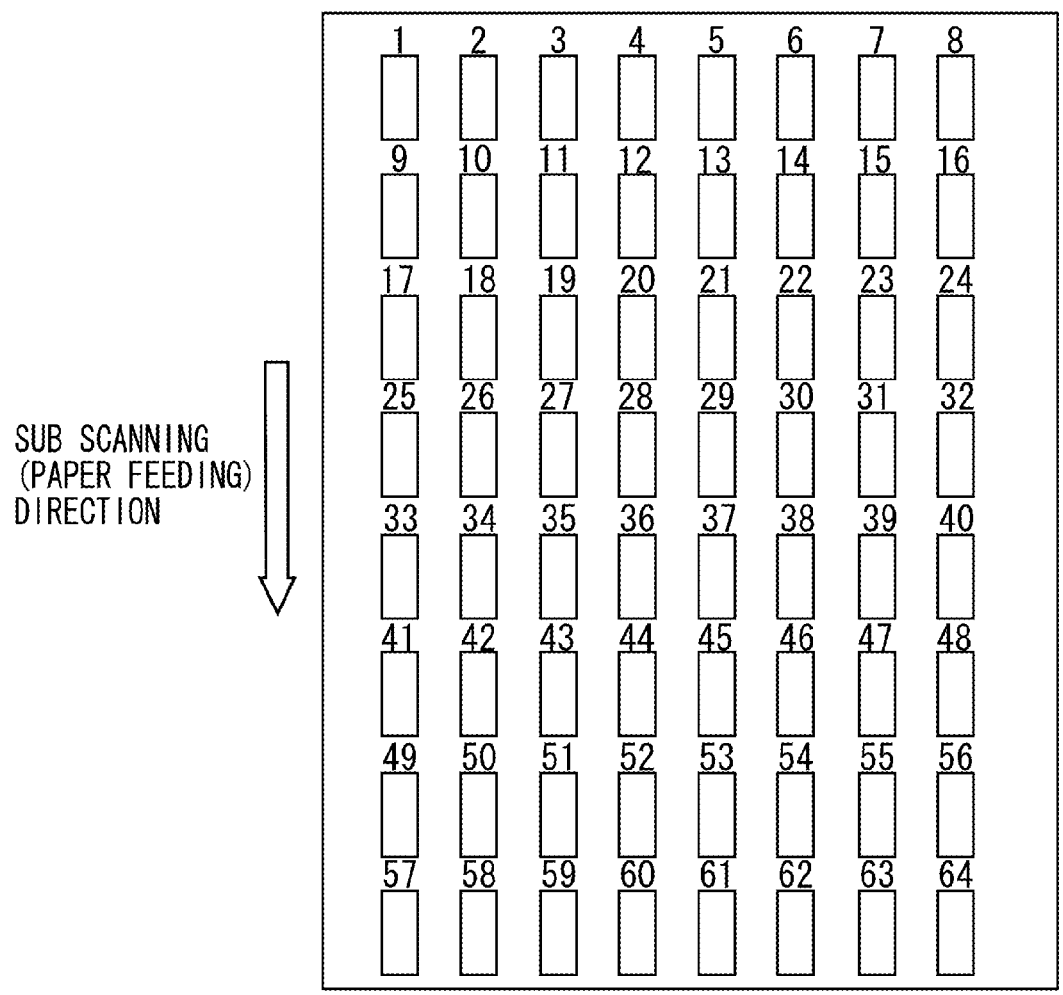

FIG. 4A illustrates an example image having been output without performing any light quantity correction. FIG. 4B illustrates example output images that have been subjected to correction at a plurality of different phases. FIG. 4C illustrates 64 patterns of corrected images together with identification numbers, which are printed on paper.

In the present exemplary embodiment, each test pattern before it is subjected to image correction processing is a 100% solid image having a certain area. However, the test pattern is arbitrarily selectable regardless of the density range of an image or the presence of a halftone. Any test pattern based on which correction effects can be clearly confirmed is employable.

Next, in step S304, a user inputs an identification number of an optimum test pattern, which is selected as a test pattern having a smallest value in uneven density among the plurality of test patterns generated in step S303 that are differentiated in phase. In this case, the user can select the optimum test pattern based on visual observation and input a selection result to the pattern selection unit 73 via an input device (not illustrated).

More specifically, in a state where the phase of actual uneven density to be generated is unknown, the pattern generation unit 72 generates a plurality of test patterns differentiated in initial phase (see step S303). The user selects an optimum test pattern having a highest correction effect (see step S304), to estimate the phase of the actual uneven density.

The leftmost test pattern image illustrated in FIG. 4B has an uneven density distribution whose phase is shifted $2/32\pi$ from the image writing timing. More specifically, the leftmost test pattern image illustrated in FIG. 4B is an example having been subjected to the image correction processing on the assumption that the phase of the uneven density is shifted by an amount of $2/32\pi$ relative to the image writing timing.

Similarly, other test pattern images are examples having been subjected to the image correction processing on the assumption that the phase of the uneven density is shifted by an amount of $3/32\pi$, $4/32\pi$, $5/32\pi$, $6/32\pi$, $7/32\pi$, and $8/32\pi$ relative to the image writing timing, respectively.

From the examples illustrated in FIG. 4B, it can be estimated that the phase of the generated uneven density is shifted by an amount of $6/32\pi$ relative to the image writing timing. The phase information estimation accuracy is dependent on a range of the phase allocated to the patterns to be generated. Therefore, it is feasible to change the phase allocation range according to the number of sheets to which the test pattern images can be output, the paper size, and allowable amplitude estimation accuracy.

The following is the reason why the amplitude is arbitrarily set when the test patterns are generated in step S303. If the amplitude is different when the light quantity correction is performed, an optimum correction cannot be performed and a certain amount of uneven density appears. However, the uneven density is worsened if correction processing is performed on an image whose phase is shifted. Therefore, when an image has a similar phase, the image can be seen flat. Therefore, the amplitude can be set appropriately.

An appropriate value is set for the amplitude (see step S308). The amplitude value can be set to an arbitrary value. However, if the amplitude value is set to 0, substantially no difference is recognized in uneven density between generated test patterns. Therefore, it is meaningless to set the amplitude value to 0.

It is desired that the amplitude value is a value similar to an actually generated uneven density and visually recognizable. In this respect, it is desired that the amplitude value is $1/128$ to $1/16$ of the dynamic range.

Further, if there is a plurality of modules that may induce any unevenness in density, a pattern having a smallest uneven density is selected from test patterns that are not subjected to the correction to be applied to the modules for which correction parameters are not yet calculated. Even in this case, an image having correction parameters can be identified as an image having a smallest value in uneven density. Therefore, there is no problem.

Next, in step S305, the correction parameter storage unit 71 stores the initial phase with reference to the identification number entered in step S304 in the correction parameter storage unit 71 while associating it with the corresponding module (i.e., an adjustment target).

Next, in step S306, the pattern generation unit 72 performs test image generation processing. More specifically, the pattern generation unit 72 prints a plurality of test patterns that have the initial phase $\alpha$ stored in the correction parameter storage unit 71 (see step S305) and are differentiated in amplitude.

The test pattern generation to be performed in step S306 is similar to the processing performed in step S303. The pattern generation unit 72 transmits the generated test pattern images to the IPS 60. The pattern generation unit 72 transmits the density variation ODvar to the laser driver 109 using the driving count Cn of the target module. In this case, the density variation ODvar can be calculated using the following formula (4).

$$ODvar = Ai \cdot f(2\pi/P \cdot Cn + \alpha) \qquad (4)$$

In formula (4), Ai represents the amplitude allocated to each of the 64 test patterns, which can be determined considering the number of sheets to which the test pattern images can be output, the paper size, and allowable amplitude estimation accuracy. Further, $\alpha$ represents the initial phase of the module stored in step S305.

Processing to be performed in step S307 is similar to the processing performed in step S304. More specifically, in step S307, the pattern selection unit 73 inputs an identification number of a most appropriately corrected test pattern.

Next, in step S308, the correction parameter storage unit 71 stores the amplitude of the generated uneven density with reference to the selected pattern number. As a result of the above-described processing, the correction parameter storage unit 71 can store the initial phase $\alpha$ and the amplitude A as parameters derived from the driving gear of the photosensitive drum.

Subsequently, in step S309, it is determined whether the above-described phase and amplitude parameter setting processing has been completed for all target modules. If it is determined that the above-described phase and amplitude parameter setting processing is not yet completed for all target modules (NO in step S309), the processing returns to step S301. The above-described processing of steps S302 to S308 is repeated for the remaining target modules.

The following is the reason why the above-described processing is performed for each of the target modules. If the periodicities of respective modules are not similar to each other, a phase change amount of each module is variable according to the image output timing.

Therefore, it is required to prepare a huge number of test patterns in estimating an optimum combination with respect to the initial phase and the amplitude for a plurality of modules. For example, if simultaneous phase estimation is performed for two modules, the number of required test patterns is 4096 (=64×64), which is a non-realistic number. If the periodicities of a plurality of modules are mutually the same or in an integer multiple relationship, it is feasible to perform the simultaneous phase estimation.

Next, example light quantity correction processing that can be performed by the density correction unit 70 based on the parameters (color Cl, periodicity P, waveform f, amplitude A, initial phase α, and driving signal count Cn) of each module is described with reference to a flowchart illustrated in FIG. 5.

In step S501, the uneven density prediction unit 74 acquires the parameters (color Cl, periodicity P, waveform f, amplitude A, initial phase α, and driving signal count Cn) of all modules from the correction parameter storage unit 71. In this case, the correction parameter storage unit 71 can detect the phase of each module because the correction parameter storage unit 71 is continuously counting the driving signal since the timing when the processing of step S303 is performed.

Further, in step S502, the uneven density prediction unit 74 calculates a summed-up density variation ODvar sum that can be obtained by summing density variation values of all modules, using the following formula (5).

$$ODvar\_sum = \Sigma A_i \cdot f_i(2\pi/P_i \cdot Cn_i + \alpha_i) \quad (5)$$

In formula (5), "i" represents a number allocated to each module.

Next, in step S503, the laser driver 109 performs image forming processing based on the information supplied from the IPS 60 as well as the information supplied from the uneven density prediction unit 74. The uneven density prediction unit 74 occasionally transmits the calculated density variation ODvar_sum to the laser driver 109. The laser driver 109 performs the image forming operation with a light quantity E, which can be calculated by the following formula (6) based on the predetermined light quantity $E_0$ corresponding to the image data output from the IPS 60 and the density variation ODvar_sum.

$$E = E_0 \times (ODtarget - ODvar\_sum)/ODtarget \quad (6)$$

The above-described processing is performed with respect to the color Cl of the target module. If the color Cl is a monochrome color (e.g., k color), the laser driver 109 performs the above-described image forming processing for the K color only. If there is a plurality of colors to be processed, the laser driver 109 performs similar image forming processing for each remaining color. Through the above-described processing, the density correction unit 70 can appropriately correct the uneven density for each output image.

When the above-described processing control is implemented, accuracy calculating the phase and the amplitude with respect to the uneven density induced by the periodicity of a target module becomes feasible without requiring a highly accurate sensor. Thus, according to the present exemplary embodiment, eliminating or reducing the uneven density with a low-cost configuration becomes feasible.

In the above-described exemplary embodiment, the driving gear of the photosensitive drum and the driving motor of the intermediate transfer belt are representative examples of the module that may induce any unevenness in density. However, any other module that constitutes the charging device, the exposure device, the developing device, the transfer device, or the fixing apparatus can be designated as a target module to obtain similar effects.

Further, the periodicity unique to the image forming section can be defined by at least one module parameter selected from a group that includes periodicity, phase, amplitude, and waveform.

Further, in the present exemplary embodiment, the sequential processing of steps S302 to S308 is repetitively performed for all modules. Alternatively, if the parameter setting processing is already completed for the first module, it is useful to generate test patterns having been subjected to light quantity correction and perform parameter estimation for the second and subsequent modules.

Further, in the above-described exemplary embodiment, an arbitrary module is selected if there is a plurality of modules to be processed (see step S301). Alternatively, the order of each module in the parameter calculation can be determined considering the easiness in visual confirmation. For example, it is useful to prioritize the processing of a module that has a longer periodicity.

It is also useful to prioritize the processing of a module that has a higher value in the human visual sensitivity characteristics (VTF) relative to the frequency of the uneven density. It is also useful to prioritize the processing of a module that may cause a variation having a large amplitude, which are predictable beforehand based on design values of the image forming apparatus.

In the first exemplary embodiment, the method for setting a correction amount based on a pattern selected from output samples has been described. In a second exemplary embodiment of the present invention, a method for setting a correction amount based on a signal obtained from a built-in sensor is employed.

The second exemplary embodiment is different from the first exemplary embodiment in the usage of a density sensor and a processing flow relating to the density correction unit 70. However, the rest of a configuration according to the second exemplary embodiment is similar to the configuration described in the first exemplary embodiment and therefore the description thereof is not repeated.

In the present exemplary embodiment, a density sensor (density detection device) 28 is disposed in an opposed relationship with the intermediate transfer belt 20. The density sensor 28 is disposed at a predetermined edge position adjacent to the black image forming unit 10K. The density sensor 28 detects the density of a toner image of each color that is primarily transferred on the intermediate transfer belt 20. Next, an example of the light quantity correction data setting processing that can be performed by the density correction unit 70 is described below in detail with reference to a flowchart illustrated in FIG. 3.

First, in step S301, the pattern generation unit 72 selects one of the modules stored in the correction parameter storage unit 71. Next, in step S302, the pattern generation unit 72 reads preliminarily stored module parameters that may induce periodic uneven density from the correction parameter storage unit 71.

Next, in step S303, the pattern generation unit 72 generates a plurality of test patterns that are similar, in periodicity, to the module having been read from the correction parameter storage unit 71 in step S302 and have correction effects differentiated in initial phase.

In the present exemplary embodiment, the amplitude is set to an arbitrary value. The pattern generation unit 72 generates an image of 64 patterns by gradually changing the initial phase in increments of 1/64 period. As schematically illustrated in FIG. 6, the generated test patterns are printed on a surface of the intermediate transfer belt 20.

The test patterns are arrayed straight in a travelling direction of the intermediate transfer belt 20 so that each test pattern can be read by the density sensor 28. In synchronization with a driving operation of the intermediate transfer belt 20, the density sensor 28 reads the density of each pattern while performing scanning. The printed patterns are not transferred onto a paper and cleaned by the belt cleaner 27.

Next, in step S304, the pattern selection unit 73 selects an optimum pattern that is smallest in uneven density with reference to output values of the density sensor 28. In the present exemplary embodiment, the density sensor 28 outputs a detection signal in synchronization with a start position of each test pattern at predetermined intervals.

An output signal is an electric signal converted from a quantity of light (per unit time) received by a light receiving unit that constitutes the density sensor 28. The output signal can be regarded as a signal representing the density of an image.

The unit time described above is sufficiently smaller compared to the periodicity to be measured. It is not required to detect a density waveform of an output resolution level of the image forming section. An optimum pattern that is smallest in uneven density is easily selectable considering a statistical amount (e.g., a variation width in signal output from the density sensor 28, a difference between a maximum value and a minimum value, etc). Therefore, it is unnecessary to provide a memory dedicated to store data indicating the accuracy with respect to an absolute density value and a density waveform. Accordingly, a simplified or low-cost density sensor can be used.

Next, in step S305, the correction parameter storage unit 71 stores an initial phase relative to a reference waveform with reference to the selected pattern number. Next, in step S306, the pattern generation unit 72 prints a plurality of test patterns that are differentiated in amplitude on the intermediate transfer belt 20 at the phase stored in the correction parameter storage unit 71 (see step S305).

Next, in step S307, the pattern selection unit 73 selects an optimum pattern that is smallest in uneven density with reference to output values of the density sensor 28. Next, in step S308, the correction parameter storage unit 71 stores the amplitude of a generated uneven density with reference to the selected pattern number. Through the above-described processing, the correction parameter storage unit 71 can store the initial phase and the amplitude with respect to the uneven density of each module.

When the above-described processing control is implemented, eliminating the uneven density induced by the periodicity of a target module becomes feasible with a low-cost sensor (i.e., without requiring a highly accurate sensor).

In the present exemplary embodiment, the phase estimation on the intermediate transfer belt has been described. However, similar effects can be obtained when the density measurement is performed on the photosensitive drum or after the fixing on a paper is completed.

Further, in the above-described exemplary embodiment, the density sensor reads a plurality of test patterns that are gradually differentiated in phase and amplitude. It is, therefore, presumed that a variation width in signal output from the density sensor gradually changes when the test patterns continuously pass through the density sensor. Hence, if a pattern having a minimum variation width in signal output is detected, subsequent pattern output processing can be omitted.

Further, in the above-described exemplary embodiment, generation of phase/amplitude test patterns is continuously performed. However, it is useful to perform the generation and measurement processing only for a limited number of patterns that can be processed within a dormant period between two ordinary image forming processes. Further, it is feasible to perform a calibration occasionally. Moreover, the pattern selection unit 73 can select an image pattern according to a user input.

In the above-described exemplary embodiment, the driving gear of the photosensitive drum and the driving motor of the intermediate transfer belt are representative examples of the module that may induce any unevenness in density. Any other module can be designated as a target module to obtain similar effects. For example, the module having unique periodicity is the voltage applied to the charging device, the number of lasers provided in the exposure device, or an eccentric/driving motor of the rotary polygonal mirror or the photosensitive drum.

Further, the module having unique periodicity is an eccentric/driving gear/driving motor of the developing roller, an eccentric/driving gear/driving motor of the transfer roller, a driving gear of the intermediate transfer belt, an eccentric/driving gear/driving motor of a fixing roller, or an eccentric/driving gear/driving motor of the registration roller.

In the first exemplary embodiment, the sequential processing relating to the phase/amplitude setting method has been described. In a third exemplary embodiment of the present invention, an example processing procedure including a conditional branch to omit some processing according to an operational state of the image forming apparatus is described below. The rest of a configuration according to the third exemplary embodiment is similar to the configuration described in the first exemplary embodiment and, therefore, the description thereof is not repeated.

Figure 7:
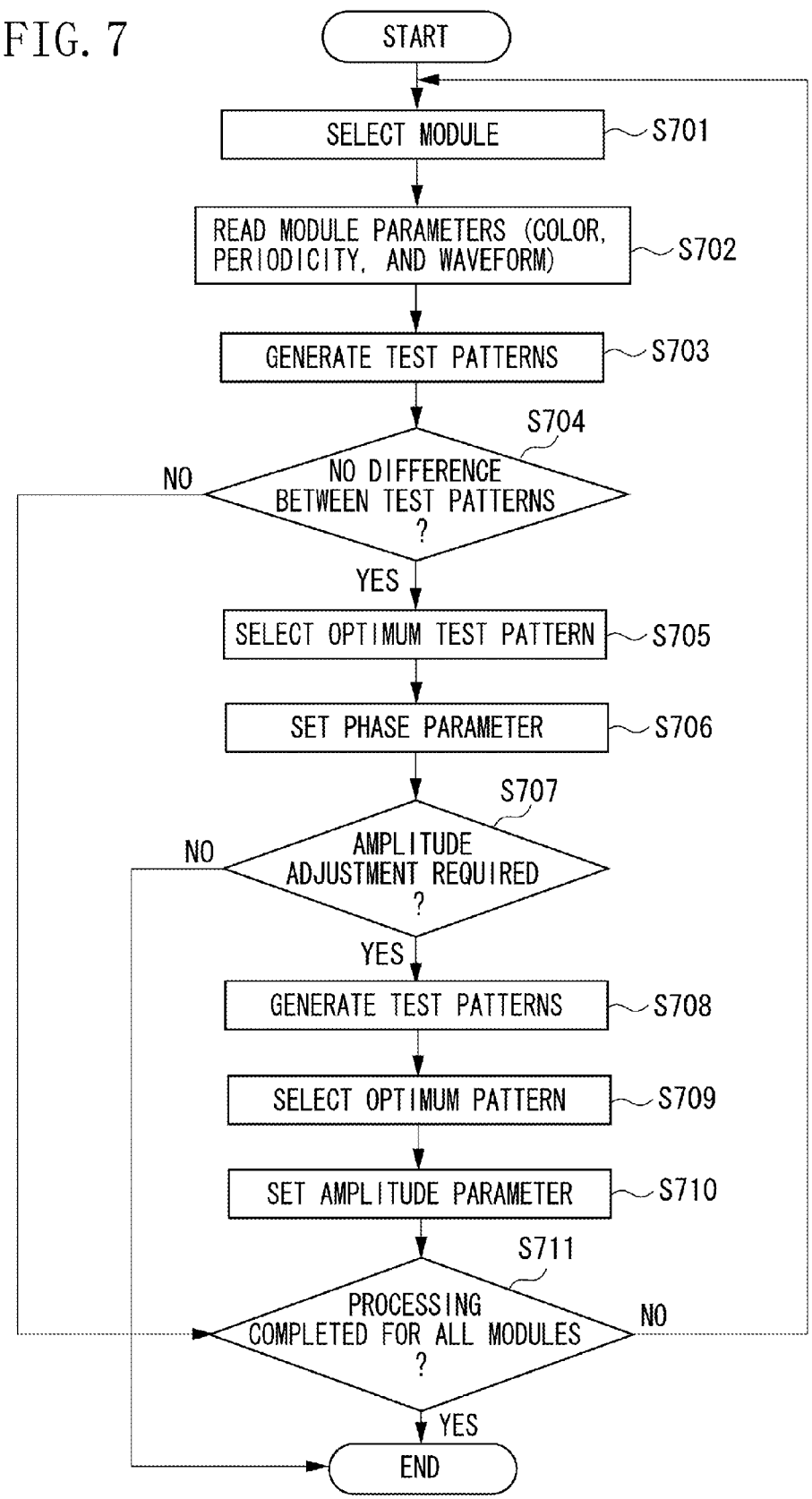
FIG. 7 is a flowchart according to a third exemplary embodiment of the present invention.

An example of the density variation data setting processing that can be performed by the density correction unit 70 is described below in more detail with reference to a flowchart illustrated in FIG. 7. Processing to be performed in steps S701, S702, and S703 is similar to the processing performed in steps S301, S302, and S303 described in the first exemplary embodiment and the description thereof is not repeated.

Next, in step S704, the density correction unit 70 performs branch processing to determine whether to execute subsequent processing in steps S705 to S711 according to a print result of the plurality of test patterns generated in step S703 that are differentiated in phase.

Figure 8A:
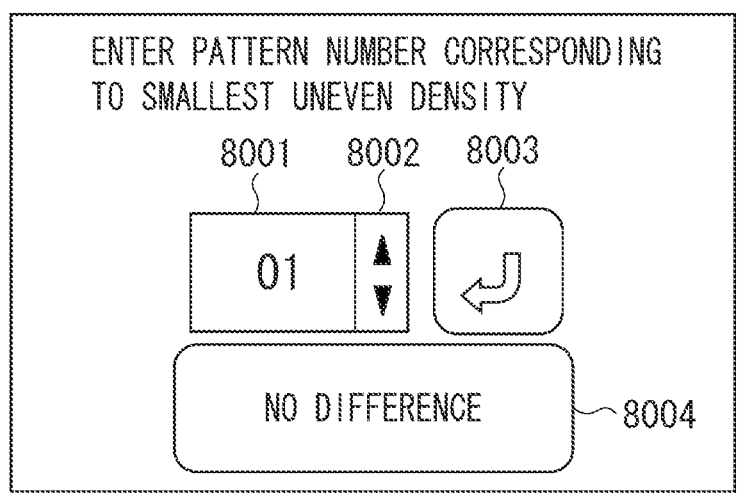
FIGS. 8A and 8B illustrate example screens of a user interface according to the third exemplary embodiment of the present invention.
Figure 8B:
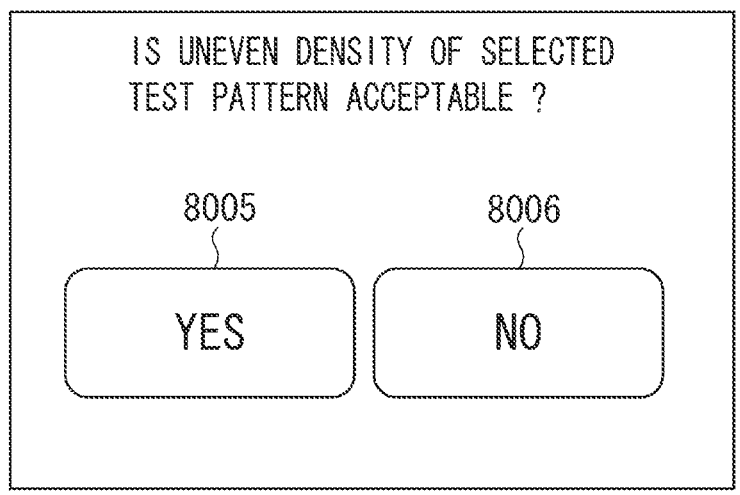

FIGS. 8A and 8B illustrate example screens of a user interface that enables a user to input instructions with respect to the test pattern selection in step S704.

First, if there is any difference between the plurality of test patterns (YES in step S704), the processing proceeds to step S705. The processing to be performed in step S705 is similar to the processing performed in step S304 described in the first exemplary embodiment. More specifically, in step S705, the user inputs an identification number of an optimum test pattern. In this case, similar to the first exemplary embodiment, the user can input the identification number, for example, via an input device (not illustrated) that displays a user interface screen illustrated in FIG. 8A.

As an example method for inputting the identification number, the user can operate a keyboard (not illustrated) to input a numerical value to be displayed in an identification number display field 8001. Alternatively, the user can use a pull-down button 8002 to select the identification number. Further, the user can press an enter button 8003 to finalize the input result.

If there is no difference between the plurality of test patterns (NO in step S704), the user clicks on a button 8004. The processing then proceeds to step S711. In this case, the correction parameter storage unit 71 sets an amplitude value to 0 and stores the amplitude value without changing the initial phase. Through the above-described processing, the density correction unit 70 terminates the density variation data setting processing for the module having been set in step S701. Processing to be performed in step S711 is similar to the processing performed in step S309 described in the first exemplary embodiment and the description thereof is not repeated.

Hereinafter, the intent to execute the branch processing in step S704 is described below. If there is not any difference between the plurality of test patterns generated in step S703, it is considered that the uneven density corresponding to the amplitude value having been set in the test pattern generation processing is generated on all test patterns.

More specifically, it is considered that the uneven density having the periodicity unique to the module having been set in step S701 has not been actually generated or cannot be visually recognized. Hence, the correction parameter storage unit 71 sets an amplitude value to 0 for the module having been set in step S701. The density correction unit 70 substantially stops the light quantity correction processing.

The initial phase is fixed in the above-described processing. However, an arbitrary value can be set as an initial phase value because the light quantity correction processing is not substantially performed when the amplitude value is 0.

Implementing the branch processing in step S704 brings an effect of skipping all of sequential steps S705 to S710. The time required to complete the processing can be reduced without lowering the accuracy in correction parameter acquisition.

Processing to be performed in step S706 is similar to the processing performed in step S305 in the first exemplary embodiment. Namely, if any difference between the plurality of test patterns is recognized, then in step S706, the correction parameter storage unit 71 stores an initial phase with reference to the selected pattern number in the correction parameter storage unit 71.

Next, in step S707, the density correction unit 70 performs branch processing to determine whether to execute subsequent processing in steps S708 to S711 according to the print result of the test pattern corresponding to the identification number input in step S705.

In some cases, the uneven density of the test pattern corresponding to the identification number having been input in step S705 may not be visually recognized or unacceptable. In this case, it is feasible to perform the uneven density correction appropriately when an image is output, if the light quantity correction processing is performed with the amplitude value used in the test pattern generation processing in step S703.

More specifically, it is difficult to set a more effective correction parameter even when the amplitude setting (i.e., steps S708 to S710 that are similar to steps S306 to S308 described in the first exemplary embodiment) is performed for the module having been set in step S701. Further, it is difficult to set a more effective correction parameter even when the above-described parameter setting is performed for any other module that is not yet selected in step S701.

Hence, the density correction unit 70 stores the amplitude value of the module whose density variation data setting is currently performed, as an amplitude value used in the test pattern generation processing in step S703, in the correction parameter storage unit 71. Further, the density correction unit 70 sets an amplitude value to 0 for the module that is not yet selected in step S701.

Then, the density correction unit 70 stores the setting data in the correction parameter storage unit 71 and terminates the density variation data setting processing. FIG. 8B illustrates an example user interface that relates to the processing to be performed in step S706. The user can select a button 8005 illustrated in FIG. 8B to input a determination result in the above-described branch processing.

In step S707, if the uneven density of the test pattern corresponding to the identification number input in step S705 is not acceptable, the user selects a button 8006 illustrated in FIG. 8B. The processing proceeds to the subsequent steps S708 to S710 to set an appropriate amplitude value.

When the above-described branch processing (see step S707) according to the third exemplary embodiment is implemented, it is feasible to omit the sequential processing in the subsequent steps S708 to S710 as well as the density variation data setting processing for any module that is not yet selected in step S701. Thus, the third exemplary embodiment can reduce the time required to complete the processing without lowering the accuracy in correction parameter acquisition.

In the third exemplary embodiment, the processing performed in a state where the phase and amplitude parameters are unknown has been described. In a fourth exemplary embodiment of the present invention, example processing capable of realizing a highly accurate adjustment with previous used adjustment parameters is described below. The rest of a configuration according to the fourth exemplary embodiment is similar to the configuration described in the third exemplary embodiment and, therefore, the description thereof is not repeated.

Figure 9A:
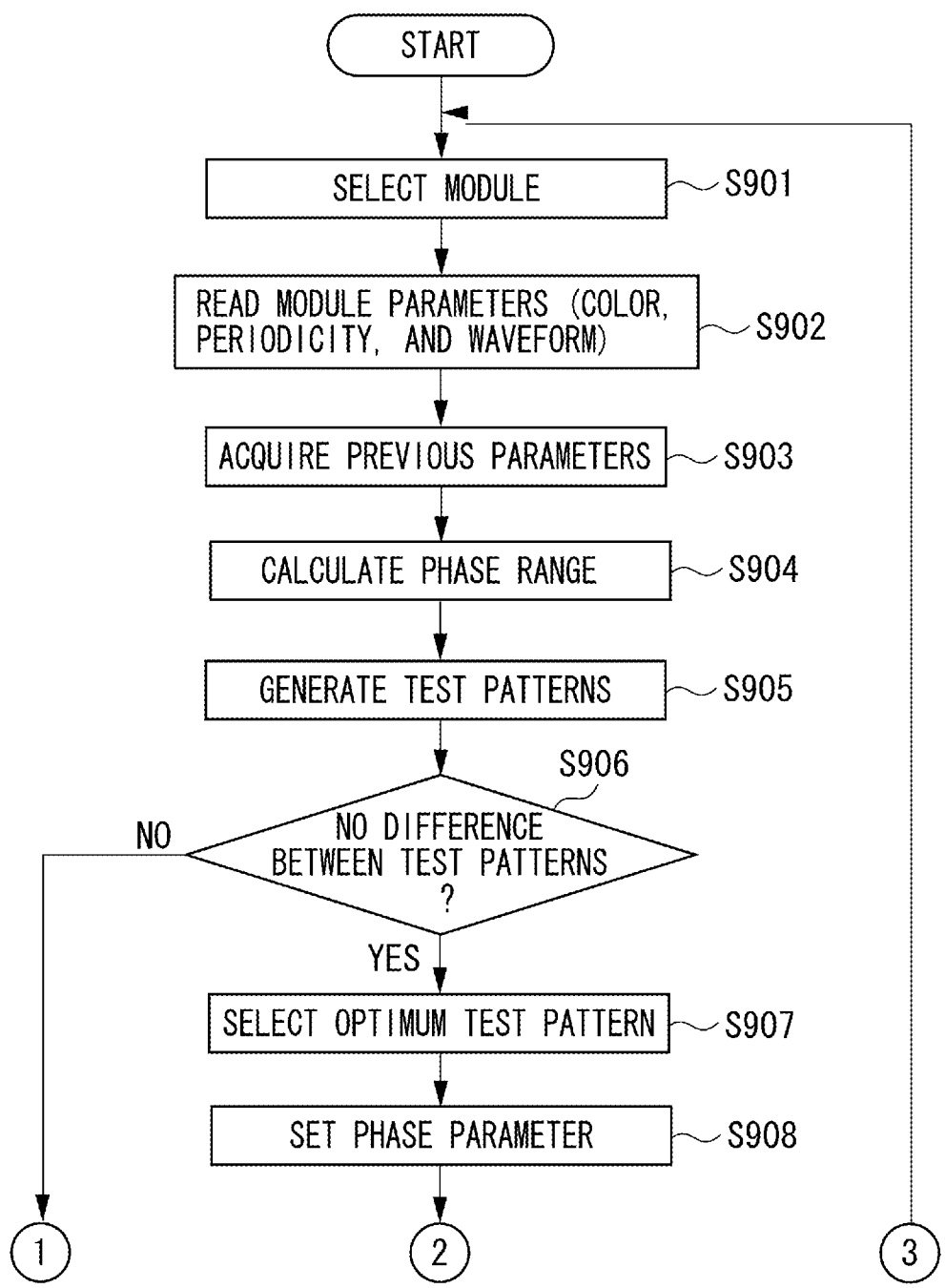

Hereinafter, an example of the density variation data setting processing that can be performed by the density correction unit 70 is described below in more detail with reference to flowcharts illustrated in FIGS. 9A and 9B.

Processing to be performed in steps S901 and S902 is similar to the processing performed in steps S701 and S702 described in the third exemplary embodiment and the description thereof is not repeated.

In step S903, the pattern generation unit 72 reads previous correction parameters from the correction parameter storage unit 71 that stores correction parameters obtained in each processing routine (see step S915).

Subsequently, in step S904, the pattern generation unit 72 determines an initial phase range of test patterns to be generated in the subsequent test image generation step S905, with reference to the previously set initial phase and the time elapsed between the previous density variation data setting processing and the present density variation data setting processing.

Hereinafter, example processing to be performed in step S904 is described below in more detail. First, the pattern generation unit 72 reads a total driving count Cn_total, which represents a count value since the previous density variation data setting processing, from the correction parameter storage unit 71. The pattern generation unit 72 calculates a generated phase error range relative to the initial phase set in the previous processing, based on the obtained total driving count Cn_total.

$$\alpha max\_err = \alpha err / Cn \cdot Cn\_total \quad (7)$$

In formula (7), $\alpha err/Cn$ represents a maximum phase error per unit count of each module, and $\alpha max\_err$ represents a maximum phase error relative to the initial phase set in the previous processing.

As an example method for calculating the maximum phase error relative to the initial phase set in the previous processing, it is useful to estimate a relationship between the driving signal count and an error generated per unit count, although it greatly depends on the design factors of the image forming apparatus. Alternatively, a method for calculating the maximum phase error based on an error amount per unit driving time of the image forming apparatus or the number of ON/OFF operations of a main power source is usable.

Then, the pattern generation unit 72 reads the initial phase $\alpha$ having been set in the previous density variation data setting processing and determines an initial phase range $\alpha_{range}$ for a test pattern to be generated.

$$\alpha_{range} = \alpha \pm \alpha max\_err \quad (8)$$

Next, in step S905, the pattern generation unit 72 generates test patterns based on the initial phase range $\alpha_{range}$ calculated in step S904. The pattern generation in this case is performed based on formula (1) described in the first exemplary embodiment. An initial phase $\alpha i$ is within the initial phase range $\alpha_{range}$. In a case where the number of the test patterns to be generated is fixed, if the initial phase range $\alpha_{range}$ is narrower than the range (0 to $2\pi$) described in the first exemplary embodiment, it is feasible to generate a plurality of test patterns of the initial phase $\alpha i$ at fine pitches. Therefore, the accuracy in initial phase estimation can be improved.

For example, if the initial phase range $\alpha_{range}$ is 0 to $1/3\pi$, it is feasible to estimate the initial phase at a higher accuracy comparable to six ($=2/(\frac{1}{3})$) times the accuracy in the first exemplary embodiment. Processing to be performed in subsequent steps S906 to S909 is similar to the processing performed in steps S704 to S707 described in the third exemplary embodiment and the description thereof is not repeated.

Next, in step S910, the pattern generation unit 72 determines an amplitude range of a test pattern to be generated based on the previously set amplitude value read in step S903. Similar to the above-described phase, the amplitude range to be set in this case greatly depends on the design factors of the image forming apparatus.

In the present exemplary embodiment, the pattern generation unit 72 calculates the amplitude range using the following formulae (9) and (10), in the same manner as the processing described in step S904.

$$A\text{max\_err} = A\text{err}/Cn \cdot Cn\_\text{total} \quad (9)$$

$$A\text{range} = A \pm A\text{max\_err} \quad (10)$$

When the above-described processing is implemented, it is feasible to improve the accuracy in amplitude estimation due to a reason similar to that for the phase estimation accuracy.

Processing to be performed in subsequent steps S911 to S914 is similar to the processing performed in steps S708 to S711 described in the third exemplary embodiment and the description thereof is not repeated.

Next, in step S915, the correction parameter storage unit 71 stores the phase and amplitude parameters having been obtained in the present density variation data setting processing. The stored parameters can be used as light quantity correction parameters for the subsequent image forming processing. Further, the recorded parameters can be used for the next density variation data setting processing.

In the present exemplary embodiment, the number of test patterns to be generated simultaneously is presumed to be constant and improvement of the accuracy in phase and amplitude parameter estimation has been described. However, the number of test patterns is in a trade-off relationship with the accuracy in correction parameter estimation. Thus, a method for setting a threshold in the pitch of each parameter is usable to reduce the number of test patterns. Further, as another example method, simultaneously performing the phase parameter setting for a plurality of modules is useful when the number of test patterns is decreased.

As described above, in the fourth exemplary embodiment, the previous correction parameters are effectively used to limit the search range for the parameters to be set in the present processing. Therefore, the accuracy in correction parameter estimation can be improved and the number of test patterns can be reduced.

Further, as another exemplary embodiment, the density sensor described in the second exemplary embodiment can be used to specify the search range with respect to the phase/amplitude of each module within the accuracy of the sensor and effectively limit the parameter range (or standard) for a visual check test pattern. Further, it is useful to select two test patterns that are first and second smallest in uneven density and perform a highly accurate parameter estimation processing using interpolated data obtained based on the selected test patterns.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-124764 filed May 31, 2010 and No. 2011-095364 filed Apr. 21, 2011, which are hereby incorporated by reference herein in their entirety.

What is claimed is:

1. An image processing apparatus comprising:
   a first pattern generation unit configured to cause an image forming section to generate a plurality of image patterns that are obtained by correcting predetermined image data using each of a plurality of correction parameters, wherein the plurality of correction parameters have periodicity unique to the image forming section and are mutually different in phase;
   a first selection unit configured to select one phase corresponding to a test pattern from the plurality of image patterns generated by the first pattern generation unit;
   a second pattern generation unit configured to cause the image forming section to generate a plurality of image patterns that are obtained by correcting predetermined image data using each of a plurality of correction parameters, wherein the plurality of correction parameters have the phase selected by the first selection unit and are mutually different in amplitude;
   a second selection unit configured to select one amplitude corresponding to a test pattern from the plurality of image patterns generated by the second pattern generation unit; and
   an image correction unit configured to correct an image based on a phase selected by the first selection unit and an amplitude selected by the second selection unit.

2. The image processing apparatus according to claim 1, wherein the periodicity unique to the image forming section is defined by at least one module parameter selected from periodicity, phase, amplitude, and waveform.

3. The image processing apparatus according to claim 1, wherein the selection unit is configured to select phase corresponding to a test pattern specified according to a user input.

4. The image processing apparatus according to claim 1, further comprising a density detection device configured to output a detection signal in synchronization with a start position of the test pattern at predetermined intervals, wherein the first selection unit is configured to cause the density detection device to measure the plurality of image patterns and to specify one of the test patterns.

5. The image processing apparatus according to claim 1, further comprising a determination unit configured to determine whether to cause the second selection unit to select one amplitude corresponding to a test pattern from the plurality of image patterns.

6. The image processing apparatus according to claim 1, further comprising a recording unit configured to record information relating to the phase selected by the first selection unit,
    wherein the first pattern generation unit is configured to cause the image forming section to generate the plurality of image patterns that are different in phase based on the information recorded by the recording unit.

7. The image processing apparatus according to claim 1, wherein the second selection unit is configured to select the amplitude corresponding to a test pattern specified according to a user input.

8. The image processing apparatus according to claim 1, further comprising a density detection device configured to output a detection signal in synchronization with a start position of the test pattern at predetermined intervals,
    wherein the second selection unit is configured to cause the density detection device to measure the plurality of image patterns and to specify one of the test patterns.

9. The image processing apparatus according to claim 1, wherein, in the first pattern generation unit and the second pattern generation unit, driving of a module for the image forming section to generate the plurality of image patterns is followed by driving of a module for the image forming section to generate on a recording medium the image corrected by the image correction unit.

10. A method for controlling an image processing apparatus, comprising:
    causing an image forming section to generate a first plurality of image patterns that are obtained by correcting predetermined image data using each of a plurality of correction parameters, wherein the plurality of correction parameters have periodicity unique to the image forming section and are mutually different in phase;
    selecting one phase corresponding to a test pattern from the generated first plurality of image patterns;
    causing the image forming section to generate a second plurality of image patterns that are obtained by correcting predetermined image data using each of a plurality of correction parameters, wherein the plurality of correction parameters have the phase selected by the selecting one phase and are mutually different in amplitude;
    selecting one amplitude corresponding to a test pattern from the generated second plurality of image patterns; and
    correcting an image based on a phase selected by the selecting one phase and an amplitude selected by the selecting one amplitude.

11. A non-transitory computer-readable storage medium that stores a program of instructions capable of causing a computer to implement an image processing apparatus, the image processing apparatus comprising:
    a first pattern generation unit configured to cause an image forming section to generate a plurality of image patterns that are obtained by correcting predetermined image data using each of a plurality of correction parameters, wherein the plurality of correction parameters have periodicity unique to the image forming section and are mutually different in phase;
    a first selection unit configured to select one phase corresponding to a test pattern from the plurality of image patterns generated by the first pattern generation unit;
    a second pattern generation unit configured to cause the image forming section to generate a plurality of image patterns that are obtained by correcting predetermined image data using each of a plurality of correction parameters, wherein the plurality of correction parameters have the phase selected by the first selection unit and are mutually different in amplitude;
    a second selection unit configured to select one amplitude corresponding to a test pattern from the plurality of image patterns generated by the second pattern generation unit; and
    an image correction unit configured to correct an image based on a phase selected by the first selection unit and an amplitude selected by the second selection unit.

* * * * *